United States Patent [19]
Kotani et al.

[11] Patent Number: 5,359,178
[45] Date of Patent: Oct. 25, 1994

[54] APPARATUS FOR DETECTING TURN-ON STATE OF PLURAL HEAT LAMPS OF A THERMAL FIXING UNIT OF A COPYING MACHINE

[75] Inventors: Akio Kotani, Aichi; Keiji Yoshida, Toyokawa, both of Japan

[73] Assignee: Minolta Camera Kabushiki Kaisha, Osaka, Japan

[21] Appl. No.: 797,695

[22] Filed: Nov. 25, 1991

[30] Foreign Application Priority Data

Nov. 26, 1990 [JP] Japan .................. 2-324618

[51] Int. Cl.$^5$ .................................... H05B 1/02
[52] U.S. Cl. .................... 219/486; 219/485; 219/481; 219/497; 219/506; 307/38; 361/93; 361/87
[58] Field of Search .............. 219/483–486, 219/481, 501, 497, 506, 508, 509; 307/38–41; 361/93, 87

[56] References Cited

U.S. PATENT DOCUMENTS

| | | | |
|---|---|---|---|
| 3,936,658 | 5/1976 | Traister et al. | 219/216 |
| 4,078,168 | 3/1978 | Kelly | 219/497 |
| 4,446,359 | 5/1984 | Arribas et al. | 219/485 |
| 4,657,572 | 4/1987 | Desai et al. | 219/485 |
| 4,737,818 | 4/1988 | Tanaka et al. | 355/14 FU |
| 4,920,252 | 4/1990 | Yoshino | 219/497 |
| 4,994,852 | 2/1991 | Matsuuchi et al. | 355/206 |
| 5,105,067 | 4/1992 | Brekkestran et al. | 219/497 |

*Primary Examiner*—Mark H. Paschall
*Attorney, Agent, or Firm*—Willian Brinks Hofer Gilson & Lione

[57] ABSTRACT

In an apparatus for detecting turn-on state of plural heaters including an electric power source for supplying electric power to the plural heaters, a controller controls the electric power source to be turned on and off so that each of the plural heaters is turned on and off in a predetermined manner, and a current sensor measures the total current supplied from the electric power source to the plural heaters. Then, a comparator compares the total current measured by the current sensor with plural reference values different from each other and outputting signals for representing comparison results thereof, and a judging circuit judges turn-on or off state of each of the plural heaters based on the signals outputted from the comparators.

6 Claims, 7 Drawing Sheets

APPARATUS FOR DETECTING TURN-ON STATE OF PLURAL HEAT LAMPS OF A THERMAL FIXING UNIT OF A COPYING MACHINE

BACKGROUND OF THE INVENTION

1. Field of the Invention

The present invention relates to an apparatus for detecting turn-on state of plural heaters, and more particularly, to an apparatus for detecting turn-on state of plural heat lamps, for example, provided in a thermal fixing unit of a copying machine.

2. Description of the Prior Art

Conventionally, there has been widely used a heat roller type thermal fixing unit in apparatuses such as electrophotographic printers and copying machines. The heat roller type thermal fixing unit comprises a pair of rollers, each roller including heat lamp therein as heating sources for the roller, and a sheet of copying paper on which a toner image has been transferred is passed between a pair of rollers so that the toner image is thermally fixed on the copying paper.

Meanwhile, a pair of heat lamps are controlled so as to be turned on and off in association with an copying operation of the copying machine. In this case, there is an optimum temperature or a range of temperature for fixing a toner image thereon, and a pair of heat lamps are automatically controlled to be turned on or off so as to maintain the optimum temperature or the optimum range of temperature (See, for example, U.S. Pat. No. 4,737,818). In order to control a pair of heat lamps to be turned on or off, there is provided a detection device for detecting whether a pair of heat lamps is really turned on or off based on the automatic control device.

In the conventional detection device, turn-on state of each of the heat lamps is individually detected by respectively detecting currents supplied thereto, or by detecting infrared lights emitted from filaments thereof.

Accordingly, since turn-on or off state of each of the heat lamps is individually detected in the conventional detection device, it is necessary to provide detection circuits for respective heat lamps. As a result, the conventional detection device can not be miniaturized.

SUMMARY OF THE INVENTION

An essential object of the present invention is therefore to provide an apparatus for detecting turn-on state of plural heaters such as heat lamps of a fixing unit of a copying machine, capable of being miniaturized as compared with the conventional apparatus.

Another object of the present invention is to provide an apparatus capable of respectively detecting turn-on state of plural heaters using one detection circuit, without individually providing detection circuit for the plural heaters In order to achieve the aforementioned objective, according to one aspect of the present invention, there is provided an apparatus for detecting turn-on state of plural heaters, comprising:

electric power supply means for supplying electric power to said plural heaters;

control means, operably connected between said electric power supply means and said plural heaters, for controlling said electric power supply means to be turned on and off so that each of said plural heaters is turned on and off in a predetermined manner;

measuring means, operably connected between said control means and said plural heaters, for measuring the total current supplied from said electric power supply means to said plural heaters;

comparing means for comparing said total current measured by said measuring means with plural reference values different from each other and outputting signals for representing comparison results thereof; and judging means for judging turn-on or off state of each of said plural heaters based on said signals outputted from said comparing means.

According to another aspect of the present invention, there is provided an apparatus for detecting turn-on state of plural heaters, comprising:

electric power source for supplying electric power through plural power supply lines to said plural heaters;

control means, operably connected in said plural power supply lines between said electric power source and said plural heaters, for controlling said electric power source to be turned on and off so that each of said plural heaters is turned on and off in a predetermined manner;

a current sensor, operably connected in said plural power supply lines between said control means and said plural heaters, for detecting the total current flowing in said plural power supply lines;

plural comparators, each of said plural comparators comparing said total current detected by said current sensor with a reference value and outputting a signal for representing a comparison result thereof, said reference values of said plural comparators being different from each other; and judging means for judging turn-on or off state of each of said plural heaters based on said signals outputted from said plural comparators.

BRIEF DESCRIPTION OF THE DRAWINGS

These and other objects and features of the present invention will become clear from the following description taken in conjunction with the preferred embodiment thereof with reference to the accompanying drawings throughout which like parts are designated by like reference numerals, and in which.

DETAILED DESCRIPTION OF THE PREFERRED EMBODIMENT

A preferred embodiment according to the present invention will be described below with reference to the attached drawings.

Figure 4:
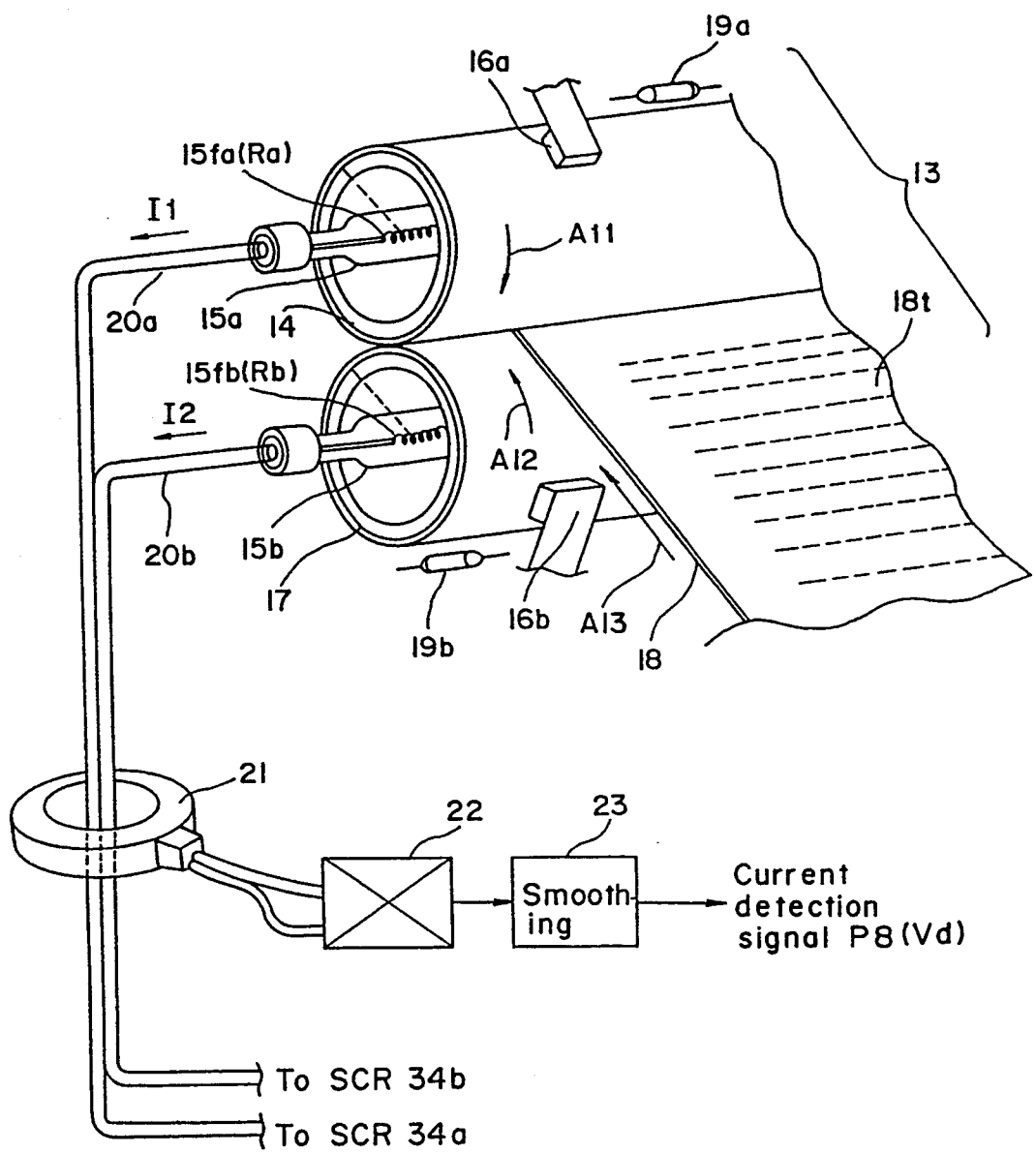
FIG. 4 is a perspective view of the thermal fixing unit of the copying machine shown in FIG. 2 and a block diagram showing a heat lamp current detection signal generator.

As shown in FIG. 4, the copying machine 1 of the preferred embodiment comprises a thermal fixing unit 13 including two heat lamps 15a and 15b, and the thermal fixing unit 13 is characterized in that turn-on state of each of the heat lamps 15a and 15b is individually detected by detecting a sum of currents supplied to the heat lamps 15a and 15b and comparing the sum of the supplied currents with reference voltages Va, Vb and Vc.

Figure 2:
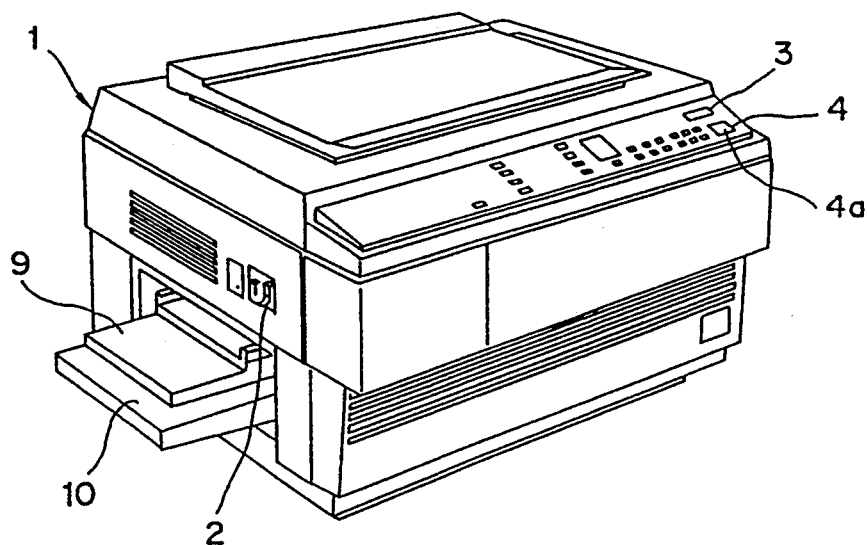
FIG. 2 is a perspective view showing an appearance of the copying machine of the preferred embodiment.

FIG. 2 shows an appearance of a copying machine 1 of a preferred embodiment according to the present invention.

Referring to FIG. 2, there is provided a main switch 2 on a side surface of the copying machine 1. When the main switch 2 is turned on, a power source of AC 100 V is electrically connected with the copying machine 1. On the upper portion of the copying machine 1, there are provided a display part 3 for displaying various kinds of information for indicating to an operator, and a print key 4 for starting a printing operation of the copying machine 1, in which there is mounted a light emitting diode (referred to as an LED hereinafter) 4a for displaying whether or not an printing operation can be performed. Further, there are detachably inserted two paper feeding cassettes 9 and 10 into the side surface of the copying machine 1.

The display part 3 displays not only a number of sheets to be copied but also trouble code when a trouble takes place in the copying machine 1. After turning on the main switch 2, until the thermal fixing unit 13 reaches a predetermined temperature, namely, until a warming up operation of the thermal fixing unit 13 is completed, an operation of the print key 4 is not accepted and an copying operation can not be performed. When the thermal fixing unit 13 has a trouble or in an abnormal state during the warming up operation, the associated trouble code is displayed on the display part 3. When there is no abnormality after completion of the warming up operation, the LED 4a of the printing key 4 is turned on after a predetermined time has passed, and then, the copying operation is started by depressing the print key 4.

Figure 3:
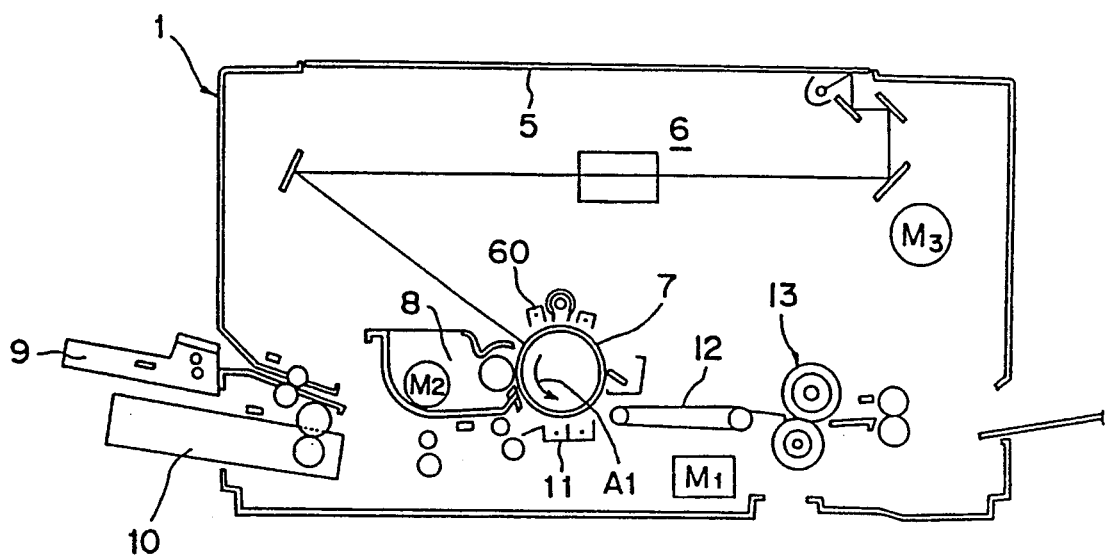
FIG. 3 is a schematic longitudinal cross sectional view of the copying machine shown in FIG. 2.

FIG. 3 is a schematic longitudinal cross sectional view of the copying machine 1 shown in FIG. 2.

Referring to FIG. 3, an image of an original placed on an original glass table 5 are scanned in a subscan direction by a scanning optical system 6, and a photoconductive drum 7 is rotated in a direction of an arrow A1 by a main motor M3 and is uniformly charged by a corona charger 60 before an exposure of reflected light from the original to the photoconductive drum 7. The photoconductive drum 7 is successively exposed to reflected light from the original so that an electrostatic latent image corresponding to the image of the original is formed on the photoconductive drum 7. The electrostatic latent image is developed with toner by a developing unit 8 so as to form the corresponding toner image on the photoconductive drum 7, and thereafter, the toner image is transferred by a transfer charger 11 onto a sheet of copying paper which has been fed from one of the paper feeding cassettes 9 and 10. Thereafter, the copying paper on which the toner image has been transferred is transported onto the thermal fixing unit 13 by a transportation belt 12, and then, the toner image is fixed on the copying paper by the thermal fixing unit 13.

A composition and an operation of the copying machine 1 for forming images are substantially the same as those of a conventional copying machine using an electrophotographic process which is known to those skilled in the art. Therefore, the detailed description thereof is omitted herein.

FIG. 4 is a perspective view of the thermal fixing unit 13 of the copying machine 1 shown in FIG. 2 and a schematic block diagram showing a heat lamp current detection signal generator.

As shown in FIG. 4, a pair of cylindrical heat rollers 14 and 17 coated with a stick-prevention material so that no toner adheres to the surface thereof is rotatably provided so as to confront each other and to contact with each other on a line positioned on the surfaces of the heat rollers 14 and 17, and a pair of heat rollers 14 and 17 is respectively heated from the inside thereof by heat lamps 15a and 15b fixedly mounted therein. The heat lamps 15a and 15b respectively comprise filaments 15fa and 15fb having respective electric resistors Ra and Rb (Ra<Rb). When the heat lamps 15a and 15b are turned on, the same voltage is applied to the respective heat lamps 15a and 15b, as described later in detail. Therefore, in the present preferred embodiment, currents I1 and I2 respectively supplied to the heat lamps 15a and 15b are different from each other, with I1>I2 being established.

A pair of heat rollers 14 and 17 are rotated respectively in directions of arrows A11 and A12 by a motor (not shown). In order to detect surface temperatures of the heat rollers 14 and 17, there are provided thermistors 16a and 16b so as to be supported by respective proper brackets (not shown) and to be in contact with or close to the surfaces of respective rollers 14 and 17. A toner image 18t formed on a sheet of copying paper 18 fed between a pair of heat rollers 14 and 17 in a direction of an arrow A13 during a thermal fixing operation is fixed by the heat rollers 14 and 17.

Furthermore, thermal fuses 19a and 19b are provided close to respective surfaces of the heat rollers 14 and 17. When each of the surface temperatures of the heat rollers 14 and 17 are equal to or higher than a predetermined temperature, each of the thermal fuses 14 and 17 is cut off. Since the thermal fuse 19a and the heat lamp 15a are electrically connected in series through a power supply line 20a to a power source 70 shown in FIG. 5b, when the thermal fuse 19a is cut off, supply of the current to the heat lamp 15a is interrupted, thereby preventing from abnormally heating the heat roller 14. Furthermore, Since the thermal fuse 19b and the heat lamp 15b are electrically connected in series through a power supply line 20b to the power source 70 shown in FIG. 5b, when the thermal fuse 19b is cut off, supply of the current to the heat lamp 15b is interrupted, thereby preventing from abnormally heating the heat roller 17.

The power supply lines 20a and 20b are bundled together, and there is provided a detection ring of a current sensor 21 around the bundled two power supply lines 20a and 20b. An output of the current sensor 21 is inputted to an amplifier 22, and then, a current detected by the current sensor 21 is converted into a voltage signal, which is outputted to a smoothing circuit 23. The smoothing circuit 23 smoothes the inputted voltage signal and outputs a smoothed voltage signal as a current detection signal P8 to a turn-on detection signal generator 40 shown in FIG. 1a.

A voltage Vd of the current detection signal P8 is proportional to a sum of currents supplied to the heat lamps 15a and 15b, which is detected by the current sensor 21. Hereinafter, the voltage Vd of the current detection signal P8 when both the heat lamps 15a and 15b are turned on is represented by $V_1$, the voltage Vd of the current detection signal P8 when only the heat lamp 15a is turned on is represented by $V_2$, and the voltage Vd of the current detection signal P8 when only the heat lamp 15b is turned on is represented by $V_3$, wherein $V_1 > V_2 > V_3 > 0$.

Figure 5A:
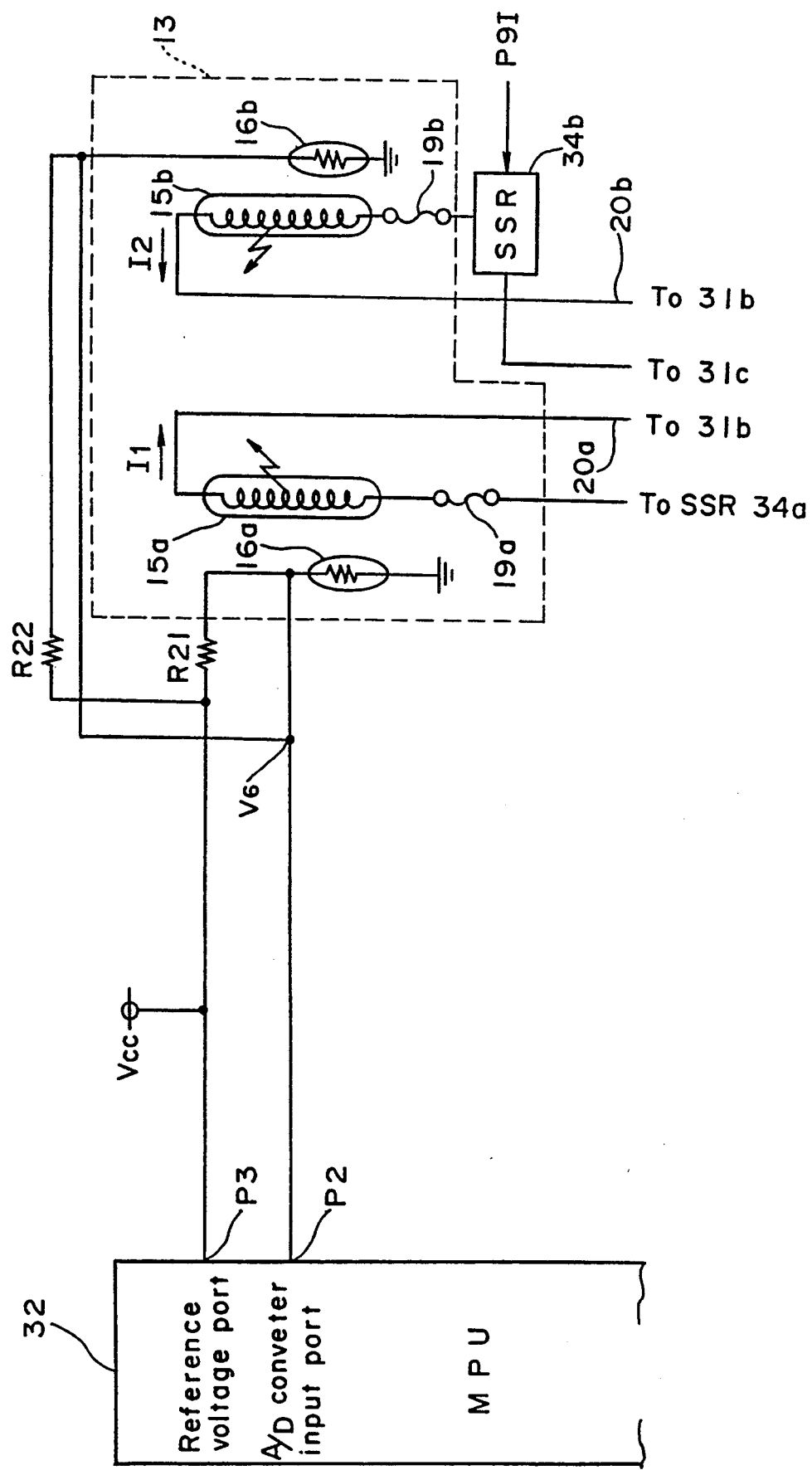
FIG. 5a is a circuit diagram showing a first part of a heat lamp turn-on controller for the thermal fixing unit shown in FIG. 4.
Figure 5B:
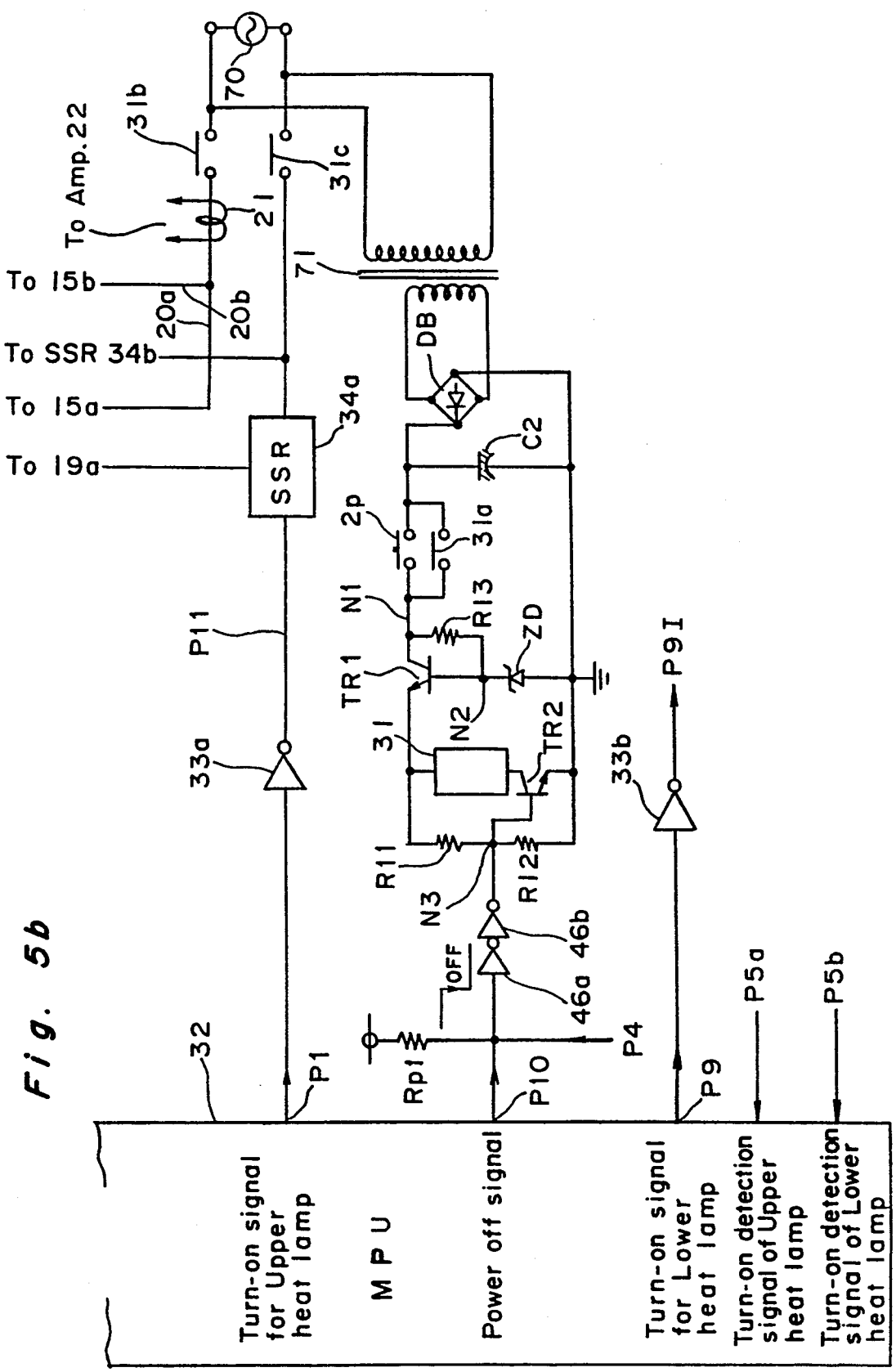
FIG. 5b is a circuit diagram showing a second part of a heat lamp turn-on controller for the thermal fixing unit shown in FIG. 4.

FIGS. 5a and 5b are circuit diagrams showing a heat lamp turn-on controller for the heat lamps 15a and 15b of the thermal fixing unit 13 shown in FIG. 4.

Referring to FIGS. 5a and 5b, one end of the heat lamp 15a of the thermal fixing unit 13 is electrically connected to one end of the power source 70 of AC 100 V through the thermal fuse 19a, a solid state relay (referred to as an SSR hereinafter) 34a such as a triode AC switch, and contact points 31c of a relay 31, while another end of the heat lamp 15a is electrically connected to another end of the power source 70 through the power supply line 20a and contact points 31b of the relay 31. Further, on end of the heat lamp 15b is electrically connected to one end of the power source 70 through the thermal fuse 19b, the SSR 34b and the contact points 31c of the relay 31, while another end of the heat lamp 15b is electrically connected to another end of the power source 70 through the power supply line 20b and the contact points 31b of the relay 31.

Furthermore, one end of the thermistor 16a is electrically connected to a DC power source Vcc through a bias voltage setting resistor R21, and another end of the thermistor 16a is electrically connected to ground. On the other hand, one end of the thermistor 16b is electrically connected to the DC power source Vcc through a bias voltage setting resistor R22, and another end of the thermistor 16b is electrically connected to ground. A voltage $V_6$ across the thermistors 16a and 16b is inputted as a thermistor voltage signal P2 into an analogue to digital conversion input port (referred to as an A/D conversion input port hereinafter) of a micro processing unit (referred to as an MPU hereinafter) 32 for controlling the heat lamps 15a and 15b to be turned on and off. In order to apply a reference voltage for an analogue to digital conversion, the DC power source Vcc is electrically connected to a reference voltage port of the MPU 32.

The heat lamp 15a is controlled to be turned on and off by an inverted turn-on signal P1I for the upper heat lamp 15a which is inputted to a control terminal of the SSR 34a after being outputted as a turn-on signal P1 for the upper heat lamp 15a from the MPU 32 and being inverted by an invertor 33a. On the other hand, the heat lamp 15b is controlled to be turned on and off by an inverted turn-on signal P9I for the lower heat lamp 15b which is inputted to a control terminal of the SSR 34b after being outputted as a turn-on signal P9 for the lower heat lamp 15b from the MPU 32 and being inverted by an invertor 33b.

A power source circuit of the copying machine 1 will be described below.

The power source 70 is electrically connected to a primary coil of a power source transformer 71, and a secondary coil of the power source transformer 71 is electrically connected through a smoothing diode bridge DB to a smoothing electrolytic capacitor C2. A positive electrode of the electrolytic capacitor C2 is electrically connected to a connection point N1 through contact points 2p of the main switch 2 and contact points 31a of a relay 31 electrically connected in parallel with each other, while a negative electrode of the electrolytic capacitor C2 is electrically connected to ground. The connection point N1 is electrically connected to not only a collector of a transistor TR1 for controlling a power source current but also a connection point N2 through a resistor R13. A base of the transistor TR1 is electrically connected through the connection point N2 to a cathode of a Zener diode ZD, an anode of which is electrically connected to ground. Furthermore, an emitter of the transistor TR1 is electrically connected to one end of the relay 31, and is also electrically connected to a connection point N3 through a resistor R11. Another end of the relay 31 is electrically connected to a collector of a transistor TR2, whose emitter is electrically connected to ground. A base of the transistor TR2 is electrically connected to the connection point N3. Furthermore, a resistor R12 is electrically connected between the connection point N3 and ground. A power off signal P10 outputted from the MPU 32 and a power off signal P4 outputted from the abnormal turn-on detection circuit 50 shown in FIG. 1b are inputted to the connection point N3 through invertors 46a and 46b. The input terminal of the invertor 46a is electrically connected to the DC power source Vcc through a pull-up resistor $Rp_1$.

As described later in detail, the MPU 32 outputs the turn-on signal P1 for the upper heat lamp 15a, the turn-on signal P9 for the lower heat lamp 15b and the power off signal P10 based on the thermistor voltage signal P2, and the turn-on detection signals P5a and P5b of the upper and lower heat lamps 15a and 15b outputted from the turn-on detection signal generator 40 shown in FIG. 1a, thereby controlling the heat lamps 15a and 15b to be turned on and off.

Figure 1A:
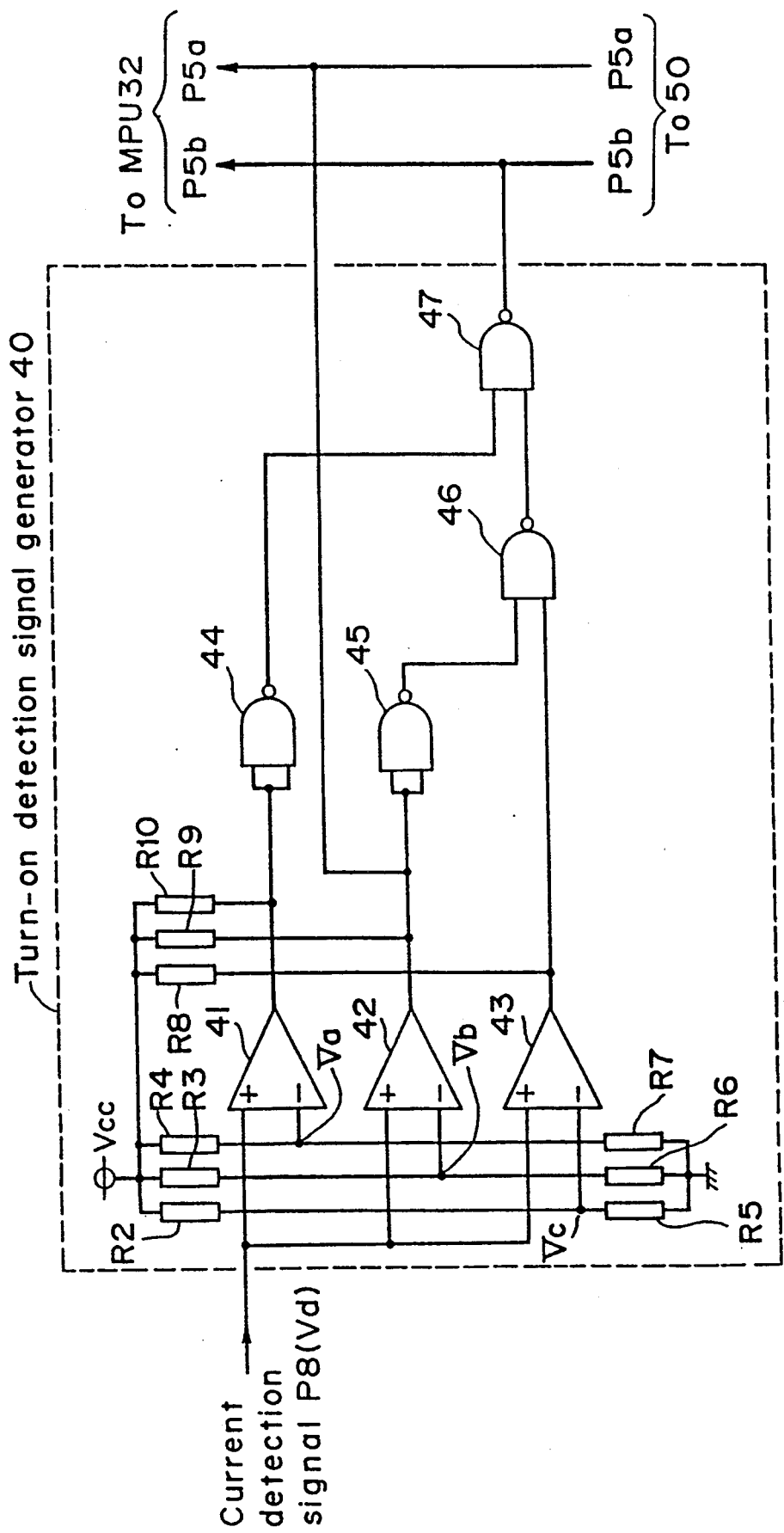
FIG. 1a is a circuit diagram showing a turn-on detection signal generator for a thermal fixing unit of a copying machine of a preferred embodiment according to the present invention.
Figure 1B:
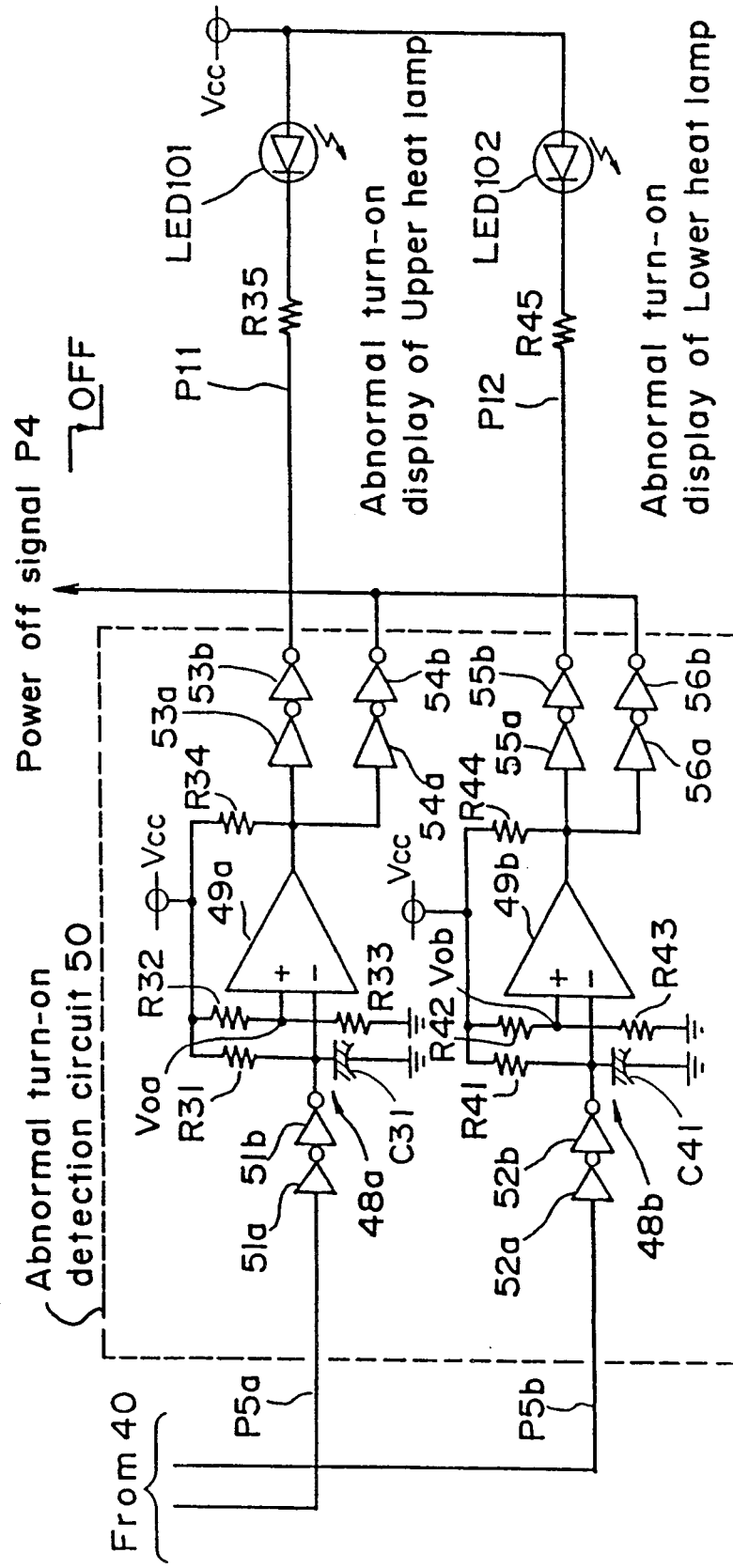
FIG. 1b is a circuit diagram showing an abnormal turn-on detection circuit and LEDs for abnormal turn-on display of upper and lower heat lamps for the thermal fixing unit of the preferred embodiment.

FIG. 1a shows the turn-on detection signal generator 40, and FIG. 1b shows the abnormal turn-on detection circuit 50 and LEDs 101 and 102 for abnormal turn-on display of the upper and lower heat lamps 15a and 15b.

Referring to FIG. 1a, the turn-on detection signal generator 40 comprises three comparators 41, 42 and 43, NAND gates 44 to 47, reference voltage setting resistors R2 to R7 and pull-up resistors R8 to R10.

The current detection signal P8 proportional to the sum of currents supplied to the heat lamps 15a and 15b which is detected by the current sensor 21 shown in FIG. 4 is inputted to respective non-inverted input terminals of the comparators 41 to 43. A reference voltage Va generated by dividing the voltage of the DC power source Vcc by the resistors R4 and R7 is inputted to an inverted input terminal of the comparator 41. Further, a reference voltage Vb generated by dividing the voltage of the DC power source Vcc by the resistors R3 and R6 is inputted to an inverted input terminal of the comparator 42. Furthermore, a reference voltage Vc generated by dividing the voltage of the power source Vcc by the resistors R2 and R5 is inputted to an inverted input terminal of the comparator 43. The reference voltages Va, Vb and Vc are set so as to establish $V_1 > Va > V_2 > Vb > V_3 > Vc > 0$, in a relationship between the signal voltages $V_1$, $V_2$ and $V_3$ of the current detection signals P8 and the above-mentioned reference voltages Va, Vb and Vc.

On the other hand, an output terminal of the comparator 41 is electrically connected to the DC power source Vcc through the pull-up resistor R10, and is also electrically connected to two input terminals of the NAND gate 44, an output terminal of which is electrically connected to a first input terminal of the NAND gate 47. Further, an output terminal of the comparator 42 is electrically connected to the DC power source Vcc through the pull-up resistor R9, and is also electrically connected to two input terminals of the NAND gate 45, an output terminal of which is electrically connected to a first input terminal of the NAND gate 46. Furthermore, an output terminal of the comparator 43 is electrically connected to the DC power source Vcc through the pull-up resistor R8 and is also electrically connected to a second input terminal of the NAND gate 46, an output terminal of which is electrically connected to a second input terminal of the NAND gate 47.

A signal outputted from the output terminal of the comparator 42 is outputted as a turn-on detection signal P5a of the upper heat lamp 15a to the MPU 32 and the abnormal turn-on detection circuit 50. Further, a signal outputted from the output terminal of the NAND gate 47 is outputted as a turn-on detection signal P5b of the lower heat lamp 15b to the MPU 32 and the abnormal turn-on detection circuit 50.

An operation of the turn-on detection signal generator 40 constituted as described above is shown in Table 1.

As shown in Table 1, the turn-on detection signal generator 40 detects turn-on or turn-off of each of the heat lamps 15a and 15b based on the current detection signal P8 which is proportional to the sum of the currents supplied to the respective heat lamps 15a and 15b. When the heat lamps 15a and 15b are turned on, the turn-on detection signal generator 40 outputs the turn-on detection signals P5a and P5b of a High level of the heat lamps 15a and 15b, respectively. On the other hand, when the heat lamps 15a and 15b are turned off, the turn-on detection signal generator 40 outputs the turn-on detection signal P5a and P5b of a Low level of the heat lamps 15a and 15b, respectively.

A composition of the abnormal turn-on detection circuit 50 will be described below.

The turn-on detection signal P5a of the upper heat lamp 15a outputted from the turn-on detection signal generator 40 is inputted to an inverted input terminal of a comparator 49a through two invertors 51a and 51b. The inverted input terminal of the comparator 49a is electrically connected to ground through an electrolytic capacitor 31 and is also electrically connected to the DC power source Vcc through a resistor R31. An integrating circuit 48a for integrating the signal P5a is constituted by the resistor R31 and the electrolytic capacitor C31.

Furthermore, the voltage of the DC power source Vcc is divided by two resistors R32 and R33 so as to generate a reference voltage Voa, which is applied to a non-inverted input terminal of the comparator 49a. An output terminal of the comparator 49a is electrically connected to the DC power source Vcc through a pull-up resistor R34. A abnormal turn-on signal P11 of the upper heat lamp 15a outputted from the output terminal of the comparator 49a is applied through two invertors 53a and 53b and a resistor R35 to an cathode of the LED 101 for indicating that the upper heat lamp 15a is abnormally turned on, and is also outputted as the power off signal P4 through two invertors 54a and 54b to the control circuit shown in FIG. 5b. Further, an anode of the LED 101 is electrically connected to the DC power source Vcc.

Furthermore, the turn-on detection signal P5b of the lower heat lamp 15b outputted from the turn-on detection signal generator 40 is inputted to an inverted input terminal of a comparator 49b through two invertors 52a and 52b. The inverted input terminal of the comparator 49b is electrically connected to ground through an electrolytic capacitor C41, and is also electrically connected to the DC power source Vcc through a resistor R41. An integrating circuit 48b for integrating the turn-on detection signal P5b is constituted by the resistor R41 and the electrolytic capacitor C41.

Furthermore, the voltage of the DC power source Vcc is divided by two resistors R42 and R43 so as to generate a reference voltage Vob, which is applied to the non-inverted input terminal of the comparator 49b. The output terminal of the comparator 49b is electrically connected to the DC power source Vcc through a pull-up resistor R44. The turn-on signal P12 of the lower heat 151 lamp 15b is outputted from the output terminal of the comparator 49b through two invertors 55a and 55b and a resistor R45 to a cathode of the LED 102 for indicating that the lower heat lamp 15b is abnormally turned on, and is also outputted as the power off signal P4 through two invertors 56a and 56b to the control circuit shown in FIG. 5b. Further, an anode of the LED 102 is electrically connected to the DC power source Vcc.

The reference voltages Voa and Vob applied to the respective non-inverted input terminals of the comparators 49a and 49b are respectively set to be higher than the signal voltage of the High level so that integrated voltage values of the turn-on detection signals P5a and P5b which are obtained by integrating them by the integrating circuits 48a and 48b become the reference voltages Voa and Vob when a predetermined time has passed since a timing when the upper and lower heat lamps 15a and 15b are turned off in the case that the upper and lower heat lamps 15a and 15b are abnormally turned on.

Accordingly, in the case that the upper and lower heat lamps 15a and 15b are abnormally turned on, when the integrated voltage values of the turn-on detection signals P5a and P5b which are obtained by integrating them by the integrating circuits 48a and 48b become the reference voltages Voa and Vob when the predetermined time has passed since a timing when the upper and lower heat lamps 15a and 15b are turned off, the comparator 49a outputs the abnormal turn-on signal P11 of the Low level of the upper heat lamp 15a to the LED 101 so as to turn on the LED 101, and also outputs it as the power off signal P4 to the control circuit shown in FIG. 5b. Further, the comparator 49b outputs the abnormal turn-on signal P12 of the Low level of the lower heat lamp 15b to the LED 102 so as to turn on the LED 102, and also outputs it as the power off signal P4 to the control circuit shown in FIG. 5b.

In the present preferred embodiment, as described later in detail, in order to detect the abnormal turn-on state of each of heat lamps 15a and 15b, the MPU 32 changes the turn-on signal P1 for the upper heat lamp 15a at a predetermined time interval in an order of the High level→the Low level→the High level→the Low level, and also changes the turn-on signal P9 for the lower heat lamp 15b at a predetermined time interval in an order of the High level→the High level→the Low level→the High level. The abnormal turn-on detection circuit 50 judges whether or not the heat lamps 15a and 15b are abnormally turned on by judging whether or not the integrated voltage values of the turn-on detection signals P5a and P5b which are obtained by integrating them by the integrating circuits 48a and 48b become the reference voltages Voa and Vob, respectively, when the predetermined time has passed since a timing when the heat lamps 15a and 15b are turned off.

A fundamental operation of the control circuit shown in FIGS. 5a and 5b will be described below.

Referring to FIG. 5, when the main switch 2 shown in FIG. 2 is turned on, the contact points 2p are closed. Then, the relay 31 is turned on, and the contact points 31a electrically connected in parallel to the contact points 2p are closed so as to be self-held. Further, the contact points 31b and 31c electrically connected to the power supply lines 20a and 20b for the upper and lower heat lamps 15a and 15b are closed, thereby supplying electric currents to the upper and lower heat lamps 15a and 15b.

When a predetermined delay time $\Delta t$ has passed since a timing when the main switch 2 is turned on, the MPU 32 becomes a stable state. At that time, the MPU 32 outputs the turn-on signal P1 for the upper heat lamp 15a in the order of the High level, the Low level, the High level and the Low level to the control terminal of the SSR 34a, and also outputs the turn-on signal P9 for the lower heat lamp 15b in the order of the High level, the High level, the Low level and the High level to the control terminal of the SSR 34b, thereby turning on the SSRs 34a and 34b in a predetermined time interval and supplying currents to the upper and lower heat lamps 15a and 15b.

In a warming-up period when the heat rollers 14 and 17 are respectively heated by the heat lamps 15a and 15b, the respective thermistors 16a and 16b detect the surface temperatures of the heat rollers 14 and 17, and output the thermistor voltage signal P2 corresponding to their surface temperatures to the A/D conversion input port of the MPU 32. Based on the reference voltage signal P3 applied to the reference voltage port of the MPU 32, the MPU 32 converts the analogue thermistor voltage signal P2 into digital data. The converted digital data are compared with set data corresponding to predetermined threshold surface temperatures of the heat rollers 14 and 17. When the surface temperatures thereof become equal to or higher than the predetermined threshold temperatures, the MPU 32 stops outputting the turn-on signals P1 and P9 of the Low level for the upper and lower heat lamps 15a and 15b so as to turn off the SSRs 34a and 34b, thereby turning off the heat lamps 15a and 15b. Thereafter, when the surface temperatures of the heat rollers 14 and 17 become lower than the predetermined threshold surface temperatures, the MPU 32 outputs the turn-on signal P1 for the upper heat lamp 15a in the order of the High level, the Low level, the High level and the Low level, thereby turning on the upper heat lamp 15a, and the MPU 32 also outputs the turn-on signal P9 for the lower heat lamp 15b in the order of the High level, the High level, the Low level and the High level, thereby turning on the lower heat lamp 15b.

The above-described fundamental operation is performed by a conventional temperature adjustment control system which is known to those skilled in the art. In the case that the control system including the upper and lower heat lamps 15a and 15b operate normally, the heat lamps 15a and 15b are repeatedly turned on and off depending on the surface temperatures of the heat rollers 14 and 17, as described above, thereby maintaining the surface temperatures in predetermined ranges.

When the surface temperatures of heat rollers 14 and 17 reach the predetermined threshold temperatures, the copying machine 1 becomes a completion state, namely, a copying operation possible state in which the copying operation can be performed. In this state, when the print key 4 is depressed, a series of copying operations including a process for turning on the main motor M3 is started.

Furthermore, referring to a timing chart of FIG. 6, the operations of the circuits shown in FIGS. 1a, 1b, 5a and 5b will be described below. In the timing chart shown in FIG. 6, it is to be noted that a time passes in an order of timings $t_1$, $t_2$, $t_3$, $t_4$, $t_5$, $t_6$ and $t_7$.

Figure 6:
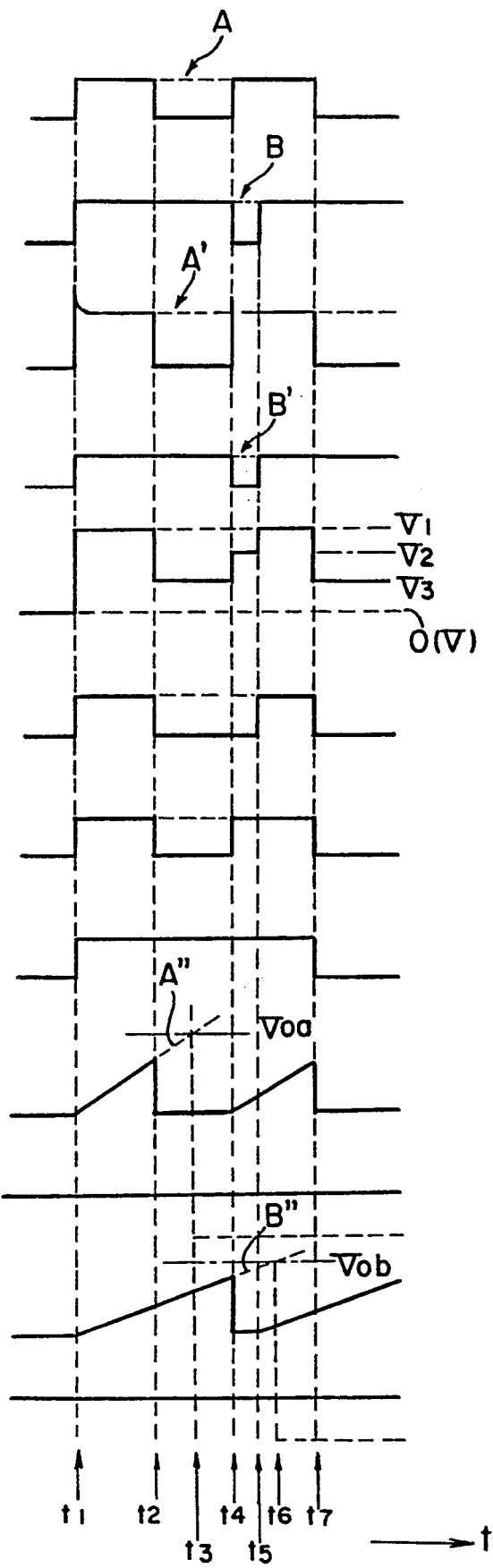
FIG. 6 is a timing chart showing one example of operations of the circuits shown in FIGS. 1a, 1b, 5a and 5b.

As shown in FIG. 6, when it is detected that the heat lamps 15a and 15b are abnormally turned on, the MPU 32 makes both the turn-on signals P1 and P9 for the upper and lower heat lamps 15a and 15b the High level during a time interval from the timing $t_1$ to the timing $t_2$, and then, during a time interval from the timing $t_2$ to the timing $t_4$, the MPU 32 makes the turn-on signal P1 for the upper heat lamp 15a the Low level and makes the turn-on signal P9 for the lower heat lamp 15b the High level. Thereafter, during a time interval from the timing $t_4$ to the timing $t_5$, the MPU 32 makes the turn-on signal P1 for the upper heat lamp 15a the High level and makes the turn-on signal P9 for the lower heat lamp 15b the Low level, and then, during a time interval from the timing $t_5$ to the timing $t_7$, the MPU 32 makes both the turn-on signals P1 and P9 for the upper and lower heat lamps 15a and 15b the High level. Thereafter, during a time interval from the timing $t_7$, the MPU 32 makes the turn-on signal P1 for the upper heat lamp 15a the Low level and makes the turn-on signal P9 for the lower heat lamp 15b the High level. The above-mentioned control operation performed by the turn-on signals P1 and P9 is referred to as an abnormal turn-on detection control of the MPU 32.

Upon the abnormal turn-on detection control of the MPU 32, in the case that the MPU 32 does not become a run away state and outputs the turn-on signals P1 and P9 so as to normally turn on or off the heat lamps 15a and 15b, the respective signal voltages change as shown in real lines of FIG. 6, namely, the integrated voltage value of the turn-on signal P5a integrated by the integrating circuit 48a does not exceed the reference voltage Voa as shown in the signal voltage of the inverted input of the comparator 49a, and also the integrated voltage value of the turn-on signal P5b integrated by the integrating circuit 48b does not exceed the reference voltage Vob as shown in the signal voltage of the inverted input of the comparator 49b. Accordingly, the abnormal turn-on signals P11 and P12 of the upper and lower heat lamps 15a and 15b and the power off signal P4 are still of the High level, and also the LEDs 101 and 102 are in the turn-off state.

However, during a time interval from the timing $t_2$ to the timing $t_4$ of the abnormal turn-on detection control of the MPU 32, in the case that the MPU 32 becomes a run away state so that the MPU 32 outputs the turn-on signal P1 of the High level as shown by a dotted line A of FIG. 6 or the heat lamp 15a is abnormally turned on as shown by a dotted line A' of FIG. 6 due to a failure of the thermistor 16a or the like, the signal voltage of the inverted input of the comparator 49a which is the integrated voltage value integrated by the integrating circuit 48a exceeds the reference voltage Voa at the timing $t_3$ as shown in a dotted line A" of FIG. 6. At that time, the comparator 49a outputs the abnormal turn-on signal P11 of the Low level of the upper heat lamp 15a to the LED 101 so as to turn on the LED 101, and also outputs the power off signal P4 of the L level to the control circuit shown in FIG. 5b so as to turn off the relay 31, thereby stopping supplying currents to the heat lamps 15a and 15b.

Further, during a time interval from the timing $t_4$ to the timing $t_5$ of the abnormal turn-on detection control of the MPU 32, in the case that the MPU 32 becomes a run away state so that the MPU 32 outputs the turn-on signal P9 of the High level as shown by a dotted line B of FIG. 6 or the heat lamp 15b is abnormally turned on as shown by a dotted line B' of FIG. 6 due to a failure of the thermistor 16b or the like, the signal voltage of the inverted input of the comparator 49b which is the integrated voltage value integrated by the integrating circuit 48b exceeds the reference voltage Vob at the timing $t_6$ as shown in a dotted line B" of FIG. 6. At that time, the comparator 49b outputs the abnormal turn-on signal P12 of the Low level of the lower heat lamp 15b to the LED 102 so as to turn on the LED 102, and also outputs the power off signal P4 of the L level to the control circuit shown in FIG. 5b so as to turn off the relay 31, thereby stopping supplying currents to the heat lamps 15a and 15b.

The above-mentioned abnormal turn-on detection control of the MPU 32 can be performed during not only an operation stand-by period or an operation period after the warming-up operation of the copying machine 1 but also the warming-up period thereof.

As described above, in the present preferred embodiment, the sum of the respective currents supplied to the heat lamps 15a and 15b is detected by the current sensor 21, and the voltage Vd of the current detection signal P8 proportional to the detected sum of the respective supplied currents is compared with the reference voltages Va, Vb and Vc which are threshold voltage values by the turn-on detection signal generator 40, thereby individually detecting turn-on state of each of the heat lamps 15a and 15b.

Furthermore, in the present preferred embodiment, since an abnormal turn-on state of each of the heat lamps 15a and 15b is detected by hardware circuit, an abnormal turn-on thereof caused due to a run away of the MPU 32 can be also detected, thereby establishing safety of the thermal fixing unit 13 more stably as compared with the conventional apparatuses.

In the present preferred embodiment, the currents supplied to the heat lamps 15a and 15b are different from each other, the present invention is not limited to this. However, the respective currents supplied to the heat lamps 15a and 15b may be equal to each other. In this case of the equal supplied currents, in order to individually detect the abnormal turn-on state of each of the heat lamps 15a and 15b, either one of the power supply lines 20a and 20b may be arranged to pass through the current sensor 21 two times or more. Namely, respective detection currents of the plural heat lamps detected by the current sensor may be different from each other so as to judge whether respective detection currents are present or absent.

In the above-mentioned present preferred embodiment, the surface temperatures of the heat lamps 15a and 15b are indirectly detected by detecting the surface temperatures of the heat rollers 14 and 17 using the thermistors 16a and 16b, however, the present invention is not limited to this. The temperatures of the heat lamps 15a and 15b may be directly detected.

In the above-mentioned present preferred embodiment, the currents supplied to the heat lamps 15a and 15b are detected by the current sensor 21 having a detection ring, however, the present invention is not limited to this. A power supply line may be provided in stead of the two power supply lines 20a and 20b electrically connected to the heat lamps 15a and 15b, and a current meter may be provided between the provided power supply line and the power source 70.

Further, it can be detected that each of the heat lamps 15a and 15b and the SSRs 34a and 34b is normally turned on or off by judging whether or not the turn-on signal P1 for the upper heat lamp 15a coincides with the turn-on detection signal P5a and whether or not the turn-on signal P9 for the lower heat lamp 15b coincides with the turn-on detection signal P5b.

As is clear from the foregoing description, according to the present preferred embodiment, it is possible to certainly detect turn-on state of each of the plural heat lamps 15a and 15b without providing a detection circuit for each of the heat lamps 15a and 15b as the conventional apparatus. Accordingly, the turn-on detection device can be miniaturized as compared with the conventional device, and the manufacturing cost thereof can be remarkably lowered advantageously.

Although the present invention has been fully described in connection with the preferred embodiment thereof with reference to the accompanying drawings, it is to be noted that various changes and modifications are apparent to those skilled in the art. Such changes and modifications are to be understood as included within the scope of the present invention as defined by the appended claims unless they depart therefrom.

TABLE 1

| | $V_1$ | $V_2$ | $V_3$ | zero |
|---|---|---|---|---|
| Signal Voltage $V_d$ | | | | |
| Turn-on signal P1 for upper heat lamp 15a | H | H | L | L |
| Turn-on signal P9 for lower heat lamp 15b | H | L | H | L |
| Output signal form Comparator 41 | H | L | L | L |
| Output signal from Comparator 42 | H | H | L | L |
| Output signal from Comparator 43 | H | H | H | L |
| Detection signal P5a of upper heat lamp 15a | H | H | L | L |
| Detection signal P5b of lower heat lamp 15b | H | L | H | L |

What is claimed is:

1. An apparatus for detecting turn-on state of plural heaters, comprising:

electric power supply means for supplying electric power to said plural heaters;

control means, operably connected between said electric power supply means and said plural heaters, for controlling said electric power supply means to be turned on and off so that each of said plural heaters is turned on and off in a predetermined manner;

measuring means, operably connected between said control means and said plural heaters, for measuring the total current supplied from said electric power supply means to said plural heaters;

comparing means for comparing said total current measured by said measuring means with plural reference values different from each other and outputting signals for representing comparison results thereof; and judging means for judging turn-on or off state of each of said plural heaters based on said signals outputted from said comparing means.

2. The apparatus as claimed in claim 1, further comprising a further judging means for judging that said plural heaters are abnormally turned on when control states of said control means are different from turn-on or off state of each of said plural heaters judged by said judging means.

3. An apparatus for detecting turn-on state of plural heaters, comprising:

electric power source for supplying electric power through plural power supply lines to said plural heaters;

control means, operably connected in said plural power supply lines between said electric power source and said plural heaters, for controlling said electric power source to be turned on and off so that each of said plural heaters is turned on and off in a predetermined manner;

a current sensor, operably connected in said plural power supply lines between said control means and said plural heaters, for detecting the total current flowing in said plural power supply lines;

plural comparators, each of said plural comparators comparing said total current detected by said current sensor with a reference value and outputting a signal for representing a comparison result thereof, said reference values of said plural comparators being different from each other; and judging means for judging turn-on or off state of each of said plural heaters based on said signals outputted from said plural comparators.

4. The apparatus as claimed in claim 3, wherein resistances of said plural heaters are different from each other.

5. The apparatus as claimed in claim 3, wherein at least one of said plural power supply lines is provided so as to pass through said current sensor at least two times.

6. An apparatus for detecting turn-on state of plural heaters, comprising:

a power supply circuit for individually energizing said plural heaters through switch means;

measuring means for measuring the total current supplied from said power supply circuit to said plural heaters;

comparing means for comparing the total current measured by said measuring means with plural reference values different from each other; and judging means for judging turn-on or off state of each of said plural heaters based on a comparison result of said comparing means.

* * * * *